A. R. BULLOCK.
APPARATUS FOR CHARGING STORAGE BATTERIES.
APPLICATION FILED JUNE 14, 1911. RENEWED SEPT. 20, 1916.
1,223,471. Patented Apr. 24, 1917.
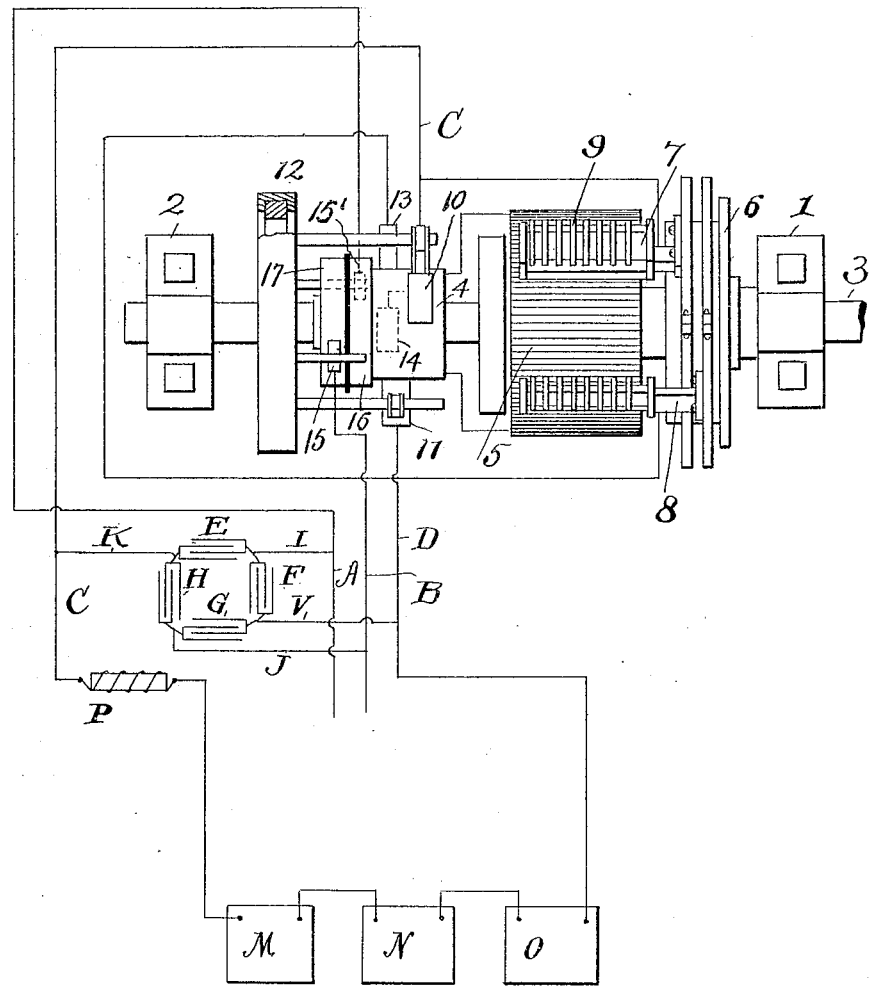

UNITED STATES PATENT OFFICE.

ARTHUR R. BULLOCK, OF CLEVELAND, OHIO, ASSIGNOR TO HENRY C. LEE, TRUSTEE, OF LOS ANGELES, CALIFORNIA.

APPARATUS FOR CHARGING STORAGE BATTERIES.

1,223,471.  Specification of Letters Patent.  Patented Apr. 24, 1917.

Application filed June 14, 1911, Serial No. 633,028. Renewed September 20, 1916. Serial No. 121,310.

*To all whom it may concern:*

Be it known that I, ARTHUR R. BULLOCK, a citizen of the United States, residing at Cleveland, in the county of Cuyahoga and State of Ohio, have invented a certain new and useful Improvement in Apparatus for Charging Storage Batteries, of which the following is a full, clear, and exact description.

This invention relates to apparatus for charging storage batteries, and has for its object the provision of an apparatus for use when the charging current is a pulsating direct current.

Generally speaking, the invention may be said to comprise the elements and combinations thereof set forth in the accompanying claims.

Reference should be had to the accompanying drawings in which the figure diagrammatically represents the apparatus.

When a pulsating current is used in charging a storage cell, if at any time the electromotive force of that current drops to zero, or if at any time the E. M. F. of the battery current should exceed the E. M. F. of the charging current, then a current will flow from the battery out upon the charging circuit conductors. As will be very clear, such a condition of affairs is not desirable, and, as a preventive against the happening of this sort of thing, (of the above condition) I have found that if a reactance be inserted in the charging current circuit and in series with the cells, this reactance will restrain the outward flow of the battery current at such times as the charging E. M. F. is less than the battery E. M. F. until the charging E. M. F. has again reached a sufficiently high value to again begin to charge the batteries; for it will be understood that the time interval in which the E. M. F. of the charging current remains below that of the battery E. M. F. is exceedingly short.

In the drawing I have illustrated one form of device which will produce a pulsating direct current, the same being a mechanical transforming device for changing alternating current into direct current.

The device, generally speaking, comprises journal supports 1 and 2, that are spaced apart and support a shaft 3, which shaft has secured thereto rotatable members 4 and 5. These members are provided with conducting segments which are insulated from each other. These segments are divided into two or more groups, the same number of groups being formed upon the member 4 as upon the member 5, and corresponding groups upon the members 4 and 5 are electrically connected.

Upon a suitable bracket 6, brush holders 7 and 8 are supported, these brush holders carrying carbon brushes which bear upon the segments on the member 5. The carbon brushes in the same holder are all electrically connected and are held in place by means of springs 9. Bearing upon the member 4 are brushes 10 and 11 which are suitably supported from a standard 12. Upon the same member 4 are other brushes 13 and 14, the brushes 14 and 10 being electrically connected, while the brushes 11 and 13 are also connected.

The arrangement of brushes is such that the brushes 13 and 14 will contact with a group of conducting segments upon the member 4 before the brushes 10 and 11 contact with the groups which are approaching them, and the brushes carried in the holders 7 and 8 remain in contact with the groups of segments with which they are in contact at the time that the brushes 10 and 11 are in contact with corresponding groups upon the member 4, after the brushes 10 and 11 have broken contact with their respective groups.

15' and 15 represent copper brushes bearing upon rings 16 and 17, and these brushes are supported from the standard 12 heretofore described.

The alternating current mains or leads A, B, are connected respectively with the brushes 15' and 15, while the direct current means or leads C, D, are connected respectively with the brushes 10 and 11.

In such an arrangement as described above, the current from the mains A, B, passes to the rings 16 and 17, thence to the groups of segments upon the rotatable member 4, and groups of segments upon the rotatable member 5, with which the aforesaid groups upon the member 4 are connected.

The shaft 3 is driven by a synchronous motor, not shown, which revolves the rotatable members 4 and 5 at such a speed that the change in polarity of the current carried by the conductors A, B, is coincident with a change of groups of segments upon the members 4 and 5 beneath the brushes bearing thereon. Therefore, the current in the conductors C, D, is always in the same direction.

A group of condensers E, F, G and H are electrically connected in series and form a closed circuit. The adjacent portions of the condensers E and F are, by means of a conductor I, joined with the main A of the alternating current circuit, while the condensers H and G at their adjacent portions are connected by the conductor J with the main B of the alternating current circuit. The condensers E and H are, by means of the conductor K, connected with the main C of the direct current circuit, while the condensers F and G are, by the conductor V, connected with the main D of the direct current circuit. These condensers are, by their connections with the two circuits as explained, always in position to interpose a condenser in parallel across the break in the alternating current circuit and the direct current circuit which occurs upon the making and breaking of contact between the groups of segments upon the rotatable members and the brushes bearing thereon. The condensers serve a two fold purpose; first, they reduce the sparking to a minimum at the break between the brushes and the segments and in the second place they reduce the magnitude of the pulsations of the direct current and this occurs because of the fact that the condensers tend to build up the direct current during the period between the pulsations. Just what phenomena takes place within the condenser circuit is uncertain, but their resultant effect is quite pronounced.

The apparatus thus described or any other apparatus producing a pulsating direct current has its direct current mains connected with a storage battery such as represented at M, N and O. And in series with the circuit connected with the batteries I place the reactance P which may be varied to suit the conditions under which the apparatus is operated. The reactance may assume any desired form and its construction is well known to those in the art. With such an arrangement the charging of the battery is continuous, and substantially no battery current can flow back upon the charging line.

Having described my invention, I claim:

1. In combination with a device for producing a pulsating direct current a circuit for supplying electric current thereto, of a storage battery to be charged by said device, an electrical connection between the battery and said device, a reactance coil in said connection and in series with the battery, and a circuit containing capacity connected between electrically connected sides of the current supply circuit for the first mentioned device and across the circuit of which the battery is a part.

2. In combination with a device for producing a pulsating direct current a circuit for supplying electric current thereto, of a storage battery to be charged by said device, an electrical connection forming part of a circuit between the battery and said device, a reactance coil in said connection and in series with the battery, and a circuit containing a condenser connected between electrically connected sides of the current supply circuit for the first mentioned device and across the circuit of which the battery is a part.

3. The combination with an alternating current circuit, of a device connected thereto for rectifying said alternating current, a direct current circuit connected to said device, a storage battery connected in said circuit, a reactance coil in the circuit and in series with the battery, and a plurality of condensers electrically connected and arranged as a closed circuit, two points upon said condenser circuit being connected with the alternating current circuit, and two other points upon the condenser circuit upon opposite sides thereof and intermediate of the first two points being connected with the circuit of which the batteries are a part.

4. In combination with an alternating current circuit, of a device connected thereto for rectifying said alternating current, a direct current circuit connected to said device, a storage battery connected in said direct current circuit, a reactance coil in the direct current circuit and in series with the battery, and a circuit containing capacity connected between electrically connected sides of the alternating current circuit and across the direct current circuit.

5. In combination with an alternating current circuit, of a device connected thereto for rectifying said alternating current, a direct current circuit connected to said device, a storage battery connected in said direct current circuit, a reactance coil in the direct current circuit and in series with the battery, and a circuit containing a condenser connected between electrically connected sides of the alternating current circuit and across the direct current circuit.

In testimony whereof, I hereunto affix my signature in the presence of two witnesses.

ARTHUR R. BULLOCK.

Witnesses:
  H. R. SULLIVAN,
  A. J. HUDSON.

Copies of this patent may be obtained for five cents each, by addressing the "Commissioner of Patents, Washington, D. C."